Figure 1:
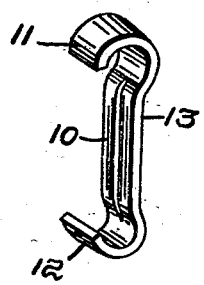

Oct. 22, 1946.　　　P. C. WENTWORTH　　　2,409,918
TWISTER TRAVELER
Filed Dec. 13, 1945

Inventor:
Philip C. Wentworth,
by  H. B. Rawlings.
Attorney

Patented Oct. 22, 1946

2,409,918

UNITED STATES PATENT OFFICE 2,409,918

TWISTER TRAVELER

Philip C. Wentworth, Providence, R. I., assignor to National Ring Traveler Company, Pawtucket, R. I., a corporation of Rhode Island Application December 13, 1945, Serial No. 634,732

11 Claims. (Cl. 57—120)

My present invention relates to self-lubricating twisting travelers for use on vertical twisting rings, and is an improvement upon the travelers disclosed in my previous Patents No. 1,415,072, dated May 9, 1922; No. 1,642,472, dated September 13, 1927; and No. 1,690,468, dated November 6, 1928.

In the prior art devices, including those disclosed in my prior patents aforesaid, the traveler was made of flat stock and consequently its contact with the ring was distributed over a considerable area when the traveler was presented squarely to the ring and was disposed at a wear-inducing angle to the ring whenever the traveler happened to assume a cocked position on the ring.

As a consequence, the lubricant collected in the grooves, recesses, and pockets and similar reservoirs of these prior art devices could not and did not flow constantly and in adequate quantity to the surfaces needing lubrication. In some instances the lubricant merely remained in the traveler reservoir until such time as the traveler in its flight assumed a position which would permit the reservoir to empty itself. In other instances, the lubricant soon escaped from the reservoir and thereafter in the continued flight of the traveler about the ring, the traveler assumed a position on the ring which precluded the reservoir from re-filling itself. In no case was there a constant and adequate supply of lubricant to the contacting surfaces of the traveler and ring at all times and under all conditions of traveler operation.

The main object of my present invention is to insure sufficient and constant lubrication between traveler and ring at all times and under all conditions of traveler operation, with consequent reduction in wear between these parts and longer life for both traveler and ring. By reducing wear to the minimum, I eliminate plating, and am able to maintain a more uniform twist and hence add greater strength to the yarn.

Other objects and advantages of my invention will appear as this description progresses.

In attaining my objects and advantages I so construct my traveler that its ring-contacting face is of double-oval configuration, thus providing a channel or groove separating the twin oval bearing surfaces.

In the flight of the traveler about the ring, this channel or groove functions as a lubricant collecting, carrying and distributing reservoir. It first becomes filled with particles of the non-fluid lubricant with which the inner face of the ring is smeared, and these particles are retained in said channel or groove until they become fluid, due to the heat generated by the traveler in flight, whereupon the melted lubricant is gradually, evenly and continuously distributed by said channel or groove over the ring face so as to afford that adequate lubrication of the contacting surfaces of traveler and ring which the traveler must have if it is to operate successfully.

By thus collecting, carrying and distributing the lubricant, I am able, in effect, to constantly interpose a film of lubricant between the contacting surfaces of traveler and ring on which the traveler may be said, theoretically, to float.

In a preferred embodiment of my invention, I construct my traveler from a strip of suitable traveler stock which is characterized in that the ring contacting face of the traveler is of double oval configuration and the outer face of the traveler is plane or substantially so. As a result of this double oval configuration, the ring contacting face of the traveler consists of two oval bearing surfaces of equal area separated by the lubricant collecting, carrying, and distributing channel or groove. These twin oval bearing surfaces have approximately the same curvature as the inner face of the ring and present smooth rounded areas to the ring. Consequently they contact the ring with the minimum of friction, due not only to their curvature but to the fact that the channel or groove which separates them constantly supplies lubricant to the face of the ring against which they bear. Such contact, moreover, is a vertical line contact, as distinguished from a surface contact, and hence any tendency of my traveler in flight to depart from its normal and intended vertical posture on the ring does not cause any significant change in the quality of the yarn being twisted. Nor does the direction in which the traveler is run on the ring, i. e. whether clockwise or counterclockwise, affect the operation of my traveler, since the lubricant channel or groove is midway between the double oval bearing surfaces and supplies lubricant equally as well to either of such oval surfaces as may happen to be acting as the leading edge of the traveler. This ability of my traveler to operate equally as well in either direction of flight, depending upon the style of twist required to be given to the yarn, is of particular advantage in the manufacture of tire cord where the several plies are twisted clockwise, but when the several plies are cabled to complete and make the finished cord the traveler operates counterclockwise.

Figure 2:
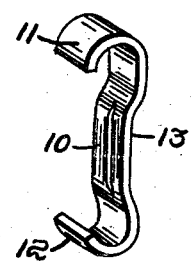
Figure 3:
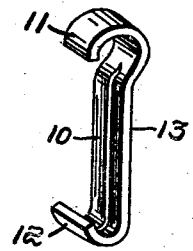

In the accompanying drawing wherein I have illustrated a preferred embodiment of my invention:

Figures 1, 2, and 3 illustrate, in perspective, typical styles of twisting travelers provided with ring contacting faces of double oval configuration in accordance with my present invention.

Figure 4:
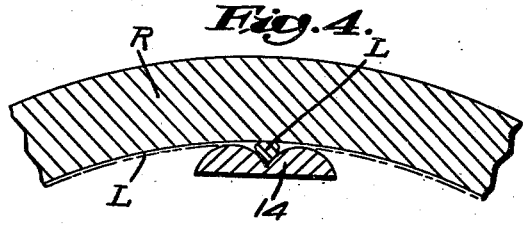
Figure 5:
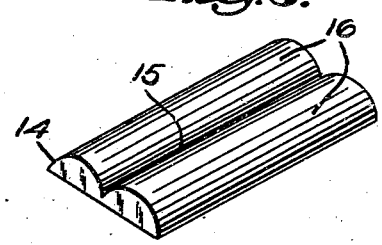

Figure 4 is a plan section through a twisting ring with one of my double-oval travelers in operating position thereon, and Figure 5 is a plan view of a strip of metal from which double-oval travelers of the styles shown in Figures 1, 2, and 3 are made.

Referring to Figures 1 to 3, the several different styles of twister travelers embodying my double-oval feature each comprise a back 10, a head 11, and a foot 12.

In the traveler shown in Figure 1, the back 10 is illustrated as bent or offset relative to the head and foot to occupy a plane 13 of relatively considerable length. In the traveler shown in Figure 2, the bend or offset of back 10 is not nearly so long as in Fig. 1, and in Fig. 3 the back 10 lies in a plane substantially coincident with the rear portion of the foot 12 and its upper end merges into head 11.

Each of the several styles of traveler shown in Figures 1, 2, and 3 is constructed from a strip of traveler stock 14 (see Figure 5) of brass, bronze or similar material, and of appropriate width. The outer face of such strip is flat. The ring-contacting face of said strip is of double oval configuration, being comprised by two oval zones or surfaces 16 which are of substantially equal area. There is thus defined, lengthwise of the strip, a channel or groove 15 of any desired depth and shape.

In the completed twister traveler, this channel or groove acts as a reservoir during the flight of the traveler around the ring to collect particles of the non-fluid lubricant L which has been smeared on the inner face of such ring, and when the twister traveler warms up, to distribute the melted lubricant constantly and in adequate supply throughout the length of the traveler and onto the ring, thus lubricating the ring and the traveler more evenly and for a longer period of time than is possible in twister travelers as heretofore made.

By reference to Figure 4, it will be noted that the curvature of the double-oval bearing surfaces 16 substantially corresponds to that of the inner face of the ring R and that irrespective of the direction in which the traveler may be run on the ring, one or the other of such oval surfaces will assist to pick up the lubricant L with which the ring face is smeared and guide it into the reservoir 15 from which it will flow in either direction over both oval surfaces when it melts to a fluid condition.

It will also be noted that in my traveler, the contact between the ring and traveler is a line contact, instead of a surface contact, as with prior devices, thus further reducing wear between the coacting parts.

While I have disclosed a preferred embodiment of my invention, I recognize that various minor changes may be made in my design without departing from the essential features of my invention as defined by the appended claims.

I claim:

1. A double-oval twister traveler capable of operating in either direction on a vertical ring, said traveler being formed from a strip of material the ring-contacting face of which is comprised by two spaced parallel oval shaped sections extending longitudinally of the traveler.

2. The traveler of claim 1 in which the outer face of the traveler is substantially flat.

3. The traveler of claim 1 in which the oval sections are spaced apart by a lubricant collecting, carrying, and distributing channel which extends throughout substantially the length of the strip.

4. The traveler of claim 1 in which the oval sections are spaced apart by a lubricant collecting, carrying, and distributing channel located substantially midway between said sections whereby said sections are of substantially equal area.

5. The traveler of claim 1 in which the oval sections have substantially the same curvature as the inner face of the ring.

6. A double-oval twister traveler capable of operating in either direction on a vertical ring, said traveler being formed from a strip of material having a substantially flat outer face and a ring-contacting face which is of double-oval configuration, said ring-contacting face being comprised by two parallel oval-shaped sections extending longitudinally of the traveler and separated by a lubricant collecting, carrying, and distributing channel.

7. The traveler of claim 6 in which the channel is located substantially midway between the oval sections whereby said sections are of substantially equal area.

8. The traveler of claim 6 in which the oval sections have vertical line contact with the inner face of the ring.

9. A double-oval twister traveler capable of operating in either direction on a vertical ring, comprising a member formed from a strip of material which is shaped to provide a back, a head, and a foot, said back being offset relative to said head and foot, the outer face of said traveler being substantially flat and the ring-contacting face thereof being comprised by two parallel oval shaped sections extending longitudinally of the traveler and separated by a lubricant collecting, carrying and distributing channel, said oval sections having substantially the same curvature as the inner face of the ring and making vertical line contact with said ring face.

10. The traveler of claim 9 in which the channel is located substantially midway between said sections whereby said sections are of substantially equal area.

11. A double-oval twister traveler capable of operating in either direction on a vertical ring, comprising a member having a ring contacting face comprised by two oval shaped sections extending longitudinally of the traveler and spaced apart by a lubricant collecting, carrying and distributing channel located substantially midway between said sections, the curvature of said sections substantially corresponding to that of the inner face of the ring and said sections making vertical line contact with said ring face.

PHILIP C. WENTWORTH.